United States Patent [19]

Warwick et al.

[11] Patent Number: 4,712,213
[45] Date of Patent: Dec. 8, 1987

[54] FLIP STATUS LINE

[75] Inventors: Alastair A. Warwick, Gloucester, United Kingdom; David P. Schenkel, Ottawa; Kenny Y. Ng, Nepean, both of Canada

[73] Assignee: Northern Telecom Limited, Montreal, Canada

[21] Appl. No.: 807,600

[22] Filed: Dec. 11, 1985

[51] Int. Cl.[4] ............................................. G01R 31/28
[52] U.S. Cl. ...................................... 371/15; 371/67; 371/70
[58] Field of Search ...................... 371/15, 21, 25, 68, 371/70; 324/73 R, 73 AT

[56] References Cited

U.S. PATENT DOCUMENTS

| | | | |
|---|---|---|---|
| 3,199,077 | 8/1965 | Prather | 371/70 |
| 3,891,143 | 6/1975 | Haeusler | 371/70 X |
| 4,061,908 | 12/1977 | deJonge et al. | 371/21 |
| 4,293,950 | 10/1981 | Shimizu et al. | 371/21 |
| 4,298,980 | 11/1981 | Hajdu et al. | 371/25 |
| 4,342,084 | 7/1982 | Sager et al. | 371/21 |
| 4,476,560 | 10/1984 | Miller et al. | 371/15 |
| 4,488,300 | 12/1984 | Horey et al. | 371/21 |
| 4,503,386 | 3/1985 | Das Gupta et al. | 324/73 R |
| 4,527,115 | 7/1985 | Mehrotra et al. | 324/73 R |
| 4,553,225 | 11/1985 | Ohe | 371/21 X |

Primary Examiner—Charles E. Atkinson
Attorney, Agent, or Firm—Schwartz, Jeffery, Schwaab, Mack, Blumenthal & Evans

[57] ABSTRACT

Fault checking of slave devices. All the slave devices are polled periodically by a master control circuit and their reponse is noted. The master control circuit asserts a control signal for every other poll so as to cause the slave device to invert the bits in its response signal when the control signal is asserted. The non-inversion of the bits during the period of several polls is indicative of either a fault condition or a device not present condition.

4 Claims, 2 Drawing Figures

| STATUS BUS | FLIP LINE | | SIGNIFICANCE |
|---|---|---|---|
| 0 | 0 | 0 | DOWN |
| 1 | 0 | 0 | WRITE |
| 0 | 1 | 0 | READ |
| 1 | 1 | 0 | UP |
| 1 | 1 | 1 | DOWN |
| 0 | 1 | 1 | WRITE |
| 1 | 0 | 1 | READ |
| 0 | 0 | 1 | UP |

FLIP STATUS LINE

BACKGROUND OF THE INVENTION

This invention relates generally to fault checking, and more particularly to fault checking of slave devices.

It is known to have master device control several slave devices. This may be done by the use of buses. In such a case, each slave device will have a unique address associated with it. A poll address bus is used to address each slave device in turn, and a poll mode bus is used to send control signals to the addressed slave device to elicit a particular response.

For example, the poll address bus may have seven lines which means that up to 128 slave devices may be involved. One test that is desirable to be able to perform is to test for the presence or absence of a slave device; another is to test for the operational status (i.e. operating or not operating) of a slave device that is present.

The test may be accomplished by using two bits to reply to the test. For example, the logic bits 11 returned by the slave device may indicate that the slave device is present and operational while the response 00 may indicate that the device is present but not operational. However, a fault may exist on the line drivers, causing the drivers to be stuck in the logic 1 position. Using known techniques this is difficult, if not imposible, to detect.

SUMMARY OF THE INVENTION

The present invention is directed to a method and a circuit for detecting such faults. Briefly stated, the present invention operates by polling, in turn, all the device locations. Each reply is noted and, after one complete polling cycle, the master control then asserts a "flip status line" whcih causes each salve device being polled to return the inverse of its reply signal. In other words, the device that replied with a logic 11 on the first polling cycle will not replay with a logic 00 if its status has not changed and if it is working properly. If it replies with a logic 11 (i.e. the same reply on both the first and second polling cycle) a fault condition exits.

Stated in other terms, the present invention is a method of verifying the response to a poll, of a device that is polled periodically so as to report its current status to a central control circuit, the method characterized by: polling the device periodically and asserting a control signal for every other poll as as to cause the device to invert the bits in its response signal when the control signal is asserted whereby the non-inversion of the bits during the period of several polls is indicative of either a fault condition or a device not present condition.

BRIEF DESCRIPTION OF THE DRAWINGS

The invention will not be described in more detail with reference to the accompanying drawings, wherein like parts in each of the several figures are identified by the same reference character, and wherein:

FIG. 1 depicts a simplified block diagram of master control circuit 20 connected to slave devices 21a, 21b, 21c, and 21d referred to collectively as slave devices 21. Master control circuit 20 is connected to slave devices 21 by the following buses. Poll address bus 22 is a seven-line bus used to send address signals to slave devices 21. Data bus 23 is a bidirectional eleven-line bus for the transfer of data between master control circuit 20 and slave devices 21. Poll mode bus 24 (four lines) is used to elicit response from slave devices 21; that is, poll address bus 22 specifies the address of the slave device 21 which is to respond, and poll mode bus 24 poses the question to be answered. Note that poll mode bus 24 sends three types of signals. They are as follows: poll-no message; poll-message; and poll-allocate (i.e. which slave device 21 has next use of data bus 23).

Figures 1, 2:
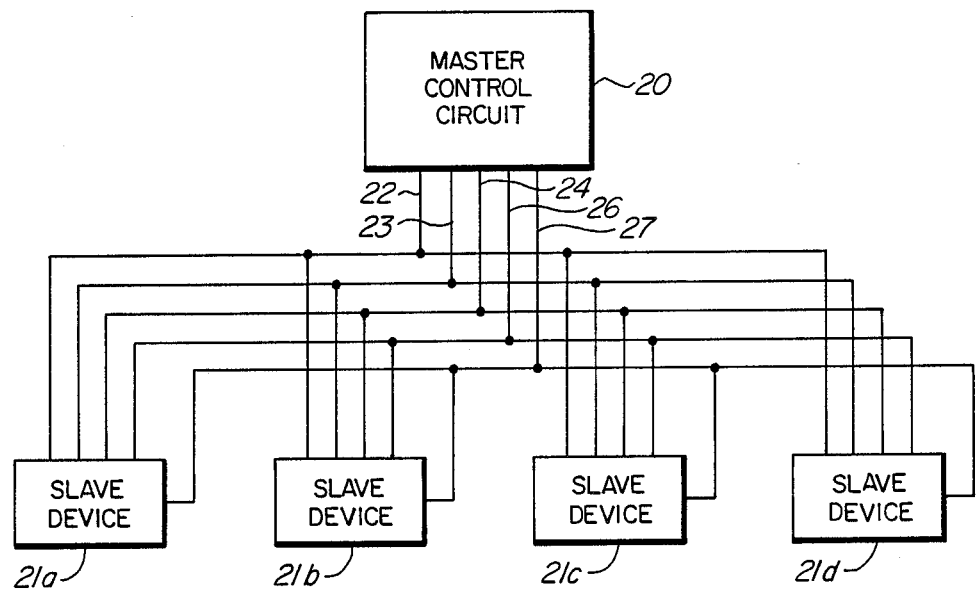
FIG. 1 is a simplified block diagram depicting one embodiment of the present invention.
FIG. 2 is a chart containing signal values useful for understanding the present invention.

Status bus 26 is a two line bus used to return the status of a slave device 21 to master control circuit 20, in response to a poll on poll address bus 22 and poll mode bus 24. The final line of FIG. 1 is flip status line 27.

Flip status line 27 is used to cause slave devices 21 to return the inverse of their normal response signal whenever line 27 is asserted (i.e. logic 1).

This is shown graphically in FIG. 2. The first four lines of the chart in FIG. 2 represent the response of a slave device 21 with flip status line 27 not asserted (i.e. logic 0). The responses are 00 representing "Down" (i.e. device present but not operating); 10 representing "Write" (i.e. device wishes to write or transmit data on data bus 13); 01 representing "Read" (i.e. device wishes to read or receive data from data bus 13); and 11 representing "Up" (i.e. device is present and operational but wishes no use of data bus 13).

The last four lines of the chart of FIG. 2 represent the responses of a slave device 21 with flip status line 27 asserted (i.e. logic 1). This causes slave devices 21 to invert the bits in their status reply and "Down" now becomes 11, "Write" becomes 01, "Read" becomes 10, and "Up" becomes 00.

In operation, master control circuit 20 polls slave devices 21a, 21b, 21c, and 21d; it then keeps repeating that polling sequence over and over again. Every other polling cycle, by master control circuit 20, has flip status line 27 set at logic 1. If the status of slave device 21 has not changed from one polling cycle to the next, then the response of slave device 21 should alternate between a given signal and its inverse from one poll to the next.

For example, assume that slave device 21a is "Up" and consequently on its first poll (flip status line 27 has a logic 0) it responds on status bus 26 with a logic 11 signal. On the second poll of slave device 21a (flip status line 27 has a logic 1) and device 21a responds on status bus 26 with a logic 00 signal (assuming no faults and assuming no change of status). If device 21a were to respond to the second poll with a logic 11 signal, this would indicate a fault (assuming no change of status).

Note that if a device is not present, the reply on status bus 26 will be a logic 00 regardless of the state of flip status line 27. In other words, status bus 26 will alternate between "Down" and "Up" which indicates slave device 21 is not present.

If a slave device 21 is present, but not operative (e.g. it has just been added to the system and is undergoing self test) it will reply to a poll (no message) with "Down" (logic 00). On the next poll it will respond again with "Down" (but this time with logic 11, due to flip status line 27). Thus, master control circuit 20 can distinguish between a connected, but inoperative slave device 21 and a missing slave device 21.

This scheme can also detect errors in the drivers of slave devices 21 that drive status bus 26.

What is claimed is:

1. A method of verifying the operation of a device that is polled periodically by a central control device so as to report its current status, said method comprising:
   polling said device and recording the response at said central control device; and
   instructing said device to invert each bit in its reply and polling said device.

2. A method of verifying the operation of a device that is polled periodically, by a central control device, so as to report its current status, said method comprising:
   polling said device periodically, asserting a control signal for every other poll so as to cause said device to invert the bits in its reply, whereby the non-inversion of said bits during the period of several polls is indicative of either a fault condition or a device not present condition.

3. A method of verifying the response to a poll, of a device that is polled periodically so as to report its current status to a central control circuit, said method comprising:
   polling said device periodically and asserting a control signal for every other poll so as to cause said device to invert the bits in its response signal when said control signal is asserted, whereby the non-inversion of said bits during the period of several polls is indicative of either a fault condition or a device not present condition.

4. A method of verifying the operation of a device that is polled periodically, by a central control device, so as to report its current status, said method comprising the steps of:
   (a) polling said device and recording a first response received from said device at a central control device;
   (b) instructing said device to invert the bits in said first response to generate a second response to reply to a successive polling of said device; and
   (c) polling said device and determining if said second response received from said device indicates that said device has inverted the bits of its second response in relation to said first response;
   whereby a determination of the non-inversion of said bits in said second response in relation to said first response is indicative of either a fault condition or a device not present condition.

* * * * *